United States Patent
Lin

(10) Patent No.: US 7,018,324 B1
(45) Date of Patent: Mar. 28, 2006

(54) MAGNETIC CONTROLLED LOADING DEVICE IN COMBINATION OF A POWER GENERATING SET AND AN ADJUSTING DRIVE MECHANISM

(76) Inventor: Lily Lin, No.278, Sijhou Rd., Yuanshan Township, Yilan County 264 (TW)

( * ) Notice: Subject to any disclaimer, the term of this patent is extended or adjusted under 35 U.S.C. 154(b) by 0 days.

(21) Appl. No.: 10/998,732

(22) Filed: Nov. 30, 2004

(51) Int. Cl.
*A63B 22/06* (2006.01)
*H02K 7/02* (2006.01)
*B60L 7/00* (2006.01)

(52) U.S. Cl. ............... 482/63; 482/5; 188/164; 188/267; 188/158; 310/74; 310/93

(58) Field of Classification Search .......... 482/5, 482/57–65; 188/158, 164, 267; 310/74, 310/93
See application file for complete search history.

(56) References Cited

U.S. PATENT DOCUMENTS

| | | | | |
|---|---|---|---|---|
| 5,072,930 A * | 12/1991 | Sun | .................. | 482/5 |
| 5,096,024 A * | 3/1992 | Wu | .................. | 188/267 |
| 5,236,069 A * | 8/1993 | Peng | .................. | 188/267 |
| 5,437,353 A * | 8/1995 | Wu | .................. | 188/164 |
| 5,586,624 A * | 12/1996 | Ko et al. | .................. | 188/164 |
| 5,711,404 A * | 1/1998 | Lee | .................. | 188/164 |
| 5,848,953 A * | 12/1998 | Wei et al. | .................. | 482/63 |
| 5,851,165 A * | 12/1998 | Wei et al. | .................. | 482/63 |
| 5,879,273 A * | 3/1999 | Wei et al. | .................. | 482/63 |
| 6,084,325 A * | 7/2000 | Hsu | .................. | 310/74 |
| 6,468,186 B1* | 10/2002 | Lay | .................. | 482/63 |

* cited by examiner

*Primary Examiner*—Stephen R. Crow
(74) *Attorney, Agent, or Firm*—Rosenberg, Klein & Lee

(57) ABSTRACT

A magnetic controlled loading device in combination of a power generating set and an adjusting drive mechanism having a flywheel, a shaft, a transmission element, a magnetic controlled loading device, a micro power generating set and an adjusting drive mechanism integrated into one single unit. It can also be taken apart and used in various combinations. By fully utilizing the limited space without increasing the volume of the flywheel and internal components, a rotor and a stator are disposed in the center of the magnetic controlled loading device. This makes the rotor's permanent magnets to be set on top of the flywheel's inner ring, so that when the flywheel is in operation, it turns into a micro power generating set. By utilizing its self generating power supply, it can provide the power needed by a small motor and by manual adjustments it can also control the changes in magnetic flux density between the flywheel and device as well to achieve continuous adjustment of loading resistance.

6 Claims, 7 Drawing Sheets

US 7,018,324 B1

MAGNETIC CONTROLLED LOADING DEVICE IN COMBINATION OF A POWER GENERATING SET AND AN ADJUSTING DRIVE MECHANISM

BACKGROUND OF THE INVENTION

1. Field of the Invention

The invention relates to a loading device installed in exercise or rehabilitation equipment used to control motion resistance, and more particularly to a loading device that combines a magnetic controlled loading device, a micro electric generator and an adjusting drive structure into a single system, which can also be taken apart and used in various combinations. The change in the magnetic flux density of the loading device can be adjusted electrically or manually in order to achieve continuous adjustment of loading resistance.

2. Description of the Related Art

U.S. Pat. No. 5,711,404, the "magnetic adjustable loading device with eddy current," refers to the eddy current resistance formed by using changes in the magnetic field, thus becoming a braking loading method. As it is a non-contact magnetic control and easy to link up with a personal computer, therefore, it is widely accepted by the market. Its fundamental principle is using a conductive metal plate and moving it through a magnetic field. The magnetic field will induce small rings of current that will create internal magnetic fields opposing the change, or so called "eddy current." Moreover, according to Maxwell's Equation, the intensity of the magnetic force is in direct proportion to the square of magnetic flux density. The magnetic force can be applied to the exercise machine's braking loading.

This type of patent also includes U.S. Pat. No. 5,879,273, U.S. Pat. No. 5,437,353, U.S. Pat. No. 5,096,024, U.S. Pat. No. 5,072,930, U.S. Pat. No. 5,236,069, U.S. Pat. No. 5,586,624, and U.S. Pat. No. 4,775,145.

Although eddy current magnetic controlled loading devices have their advantages and features, yet if the loading portion uses permanent magnets as its magnetic field source, then it is very difficult to link up to external digital signals, and thereby unable to attain the goal of computerization and digitization, unless there is a motor and motor controller to change the relative location of the magnets and conductors, or utilizing magnetic wire coils and external power sources to overcome these problems. However, in many situations, using external power sources creates a lot of inconvenience and thus greatly reduces its practical use. Therefore, it is generally used by lower priced exercise machines, but today's exercise machines place a growing emphasis on accuracy and effectiveness, which requires the help of computer data. Furthermore, digitized exercise machines need parts such as instrument panels and control boards that have to use electricity, which still needs to be provided through external power sources. This increases a lot of problems and limitations.

In addition, U.S. Pat. No. 6,084,325 shows a "brake device with a combination of power-generating and eddy current magnetic resistance," which uses an external rotating flywheel to generate power for a brake core on the outer edge of the flywheel. The brake core then provides the flywheel with a certain preset eddy current magnetic resistance. This type of loading device generates sufficient power. Not only can it generate power for the brake core, but also provide enough power needed by the exercise machine's control panel. However, although placing the brake core on the outer edge of the flywheel can meet the needs of large intensity exercise machines, but when placed on small intensity exercise machines, its intensity and weight become too large and heavy. With the limited amount of space to utilize, its costs are also high, so it is not applicable to every type of exercise or rehabilitation machine.

As such, the inventor has studied the problems mentioned above and made improvements with the hope of coming up with a source of power that is simple in structure, small and lightweight, and can automatically control the eddy current magnetic resistance.

SUMMARY OF THE INVENTION

The main object of the invention is to provide an eddy current magnetic controlled loading device by fully utilizing limited space without increasing the volume of the flywheel and internal components. A rotor and a stator are carefully set in the center of the magnetically controlled loading device, which makes the rotor's permanent magnet to be set on top of the flywheel's inner ring, so that when the flywheel is in operation, it turns into a micro power generator. By utilizing its self generating power supply, it can provide the power needed by a small motor. The small motor controls the changes in magnetic flux density between the flywheel and device to achieve continuous adjustment of loading resistance.

Another object of the invention is to reduce costs for small intensity exercise machines due to the small intensity and light weight of the magnetically controlled loading device.

A further object of the invention is to allow the magnetically controlled loading device to be electrically or manually taken apart and used in various combinations through the small motor controlling the magnetic flux density.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Figure 1:
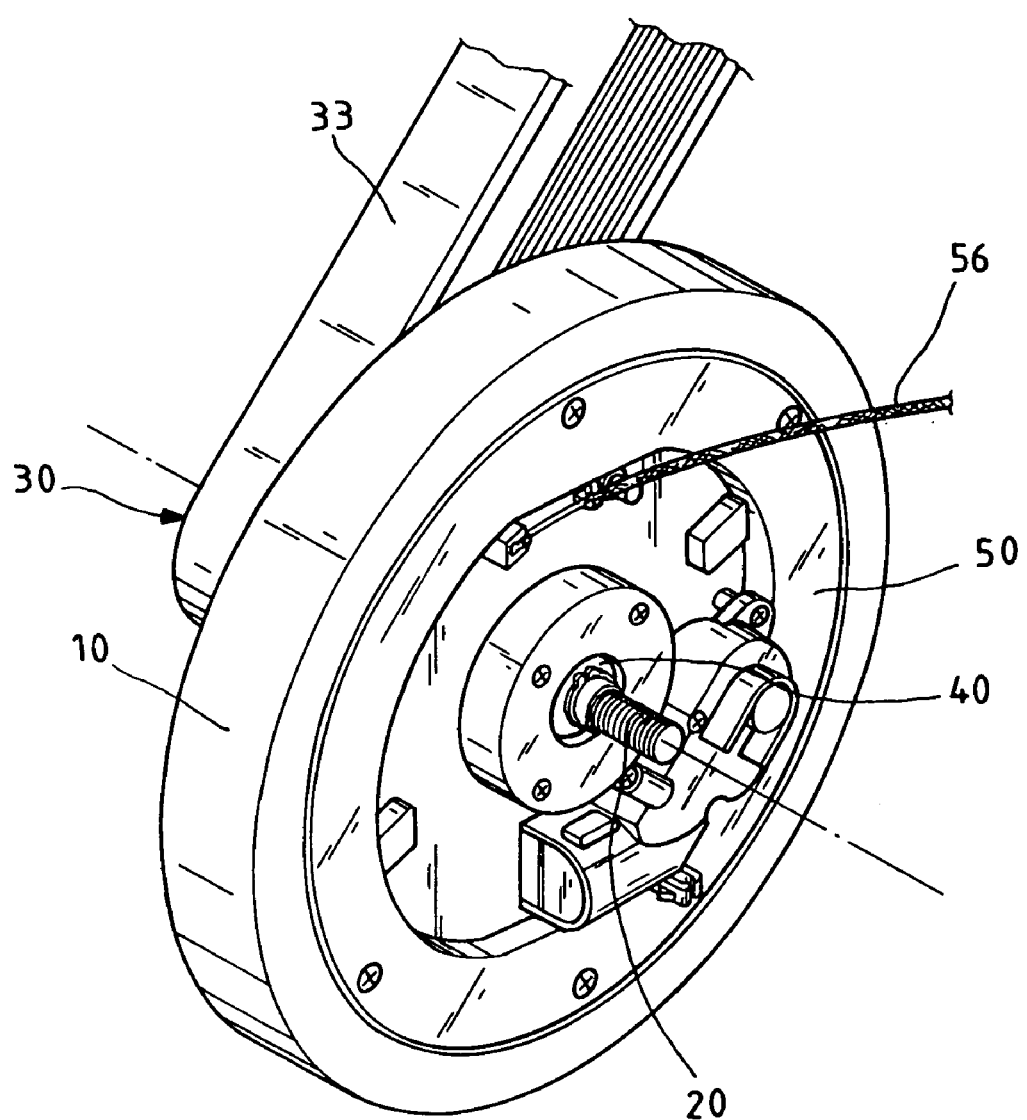
FIG. 1 is a perspective view of the invention.

First, please refer to FIG. 1. The invention mainly includes: a flywheel 10, a shaft 20, a transmission element 30, a belt 33 that turns the transmission element 30, a micro power generating set 40 placed in the center of the flywheel 10, and a magnetic controlled loading device 50 placed on the flywheel's receptacle.

Figure 2:
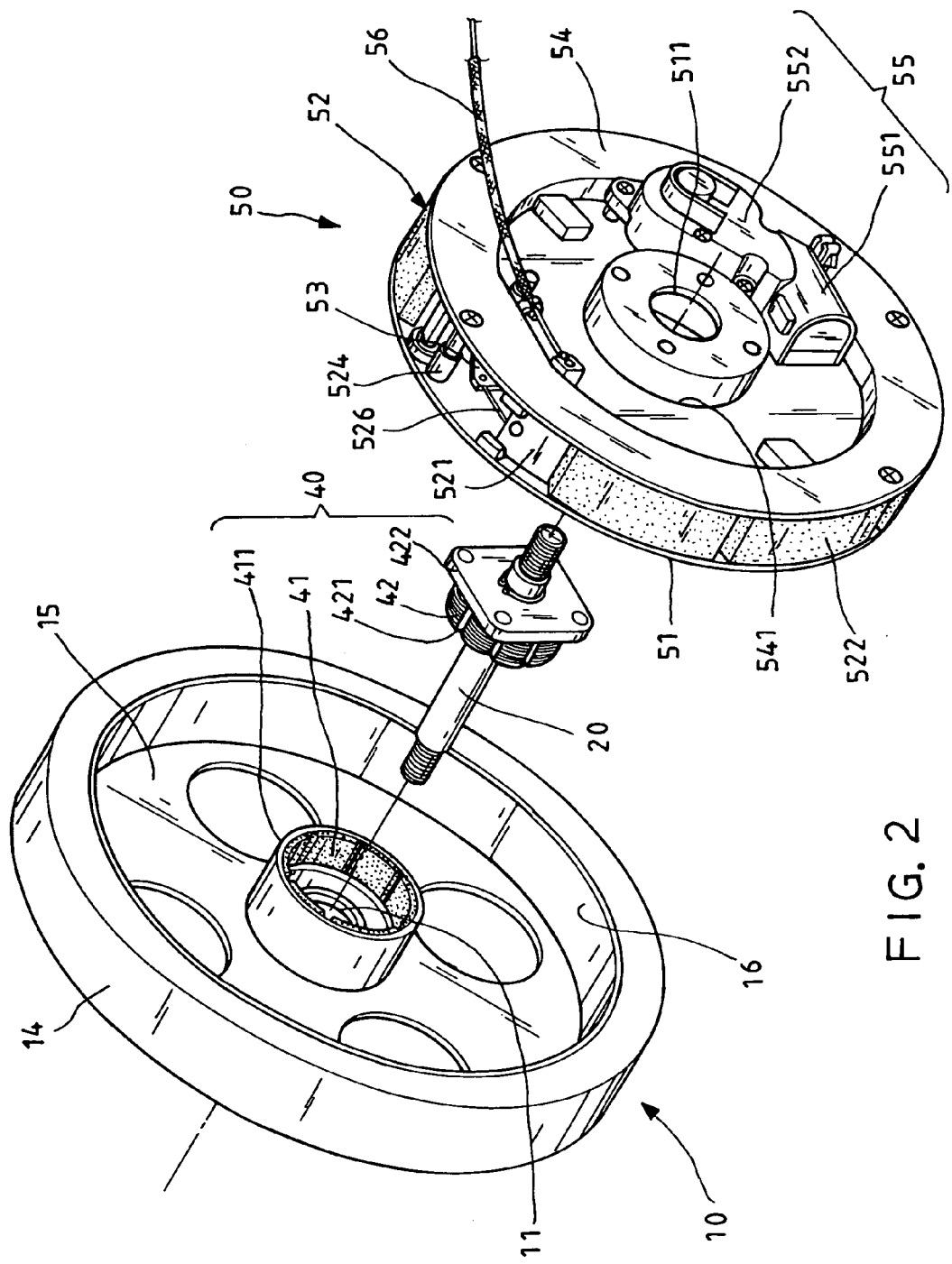
FIG. 2 is an exploded view of the invention.
Figure 3:
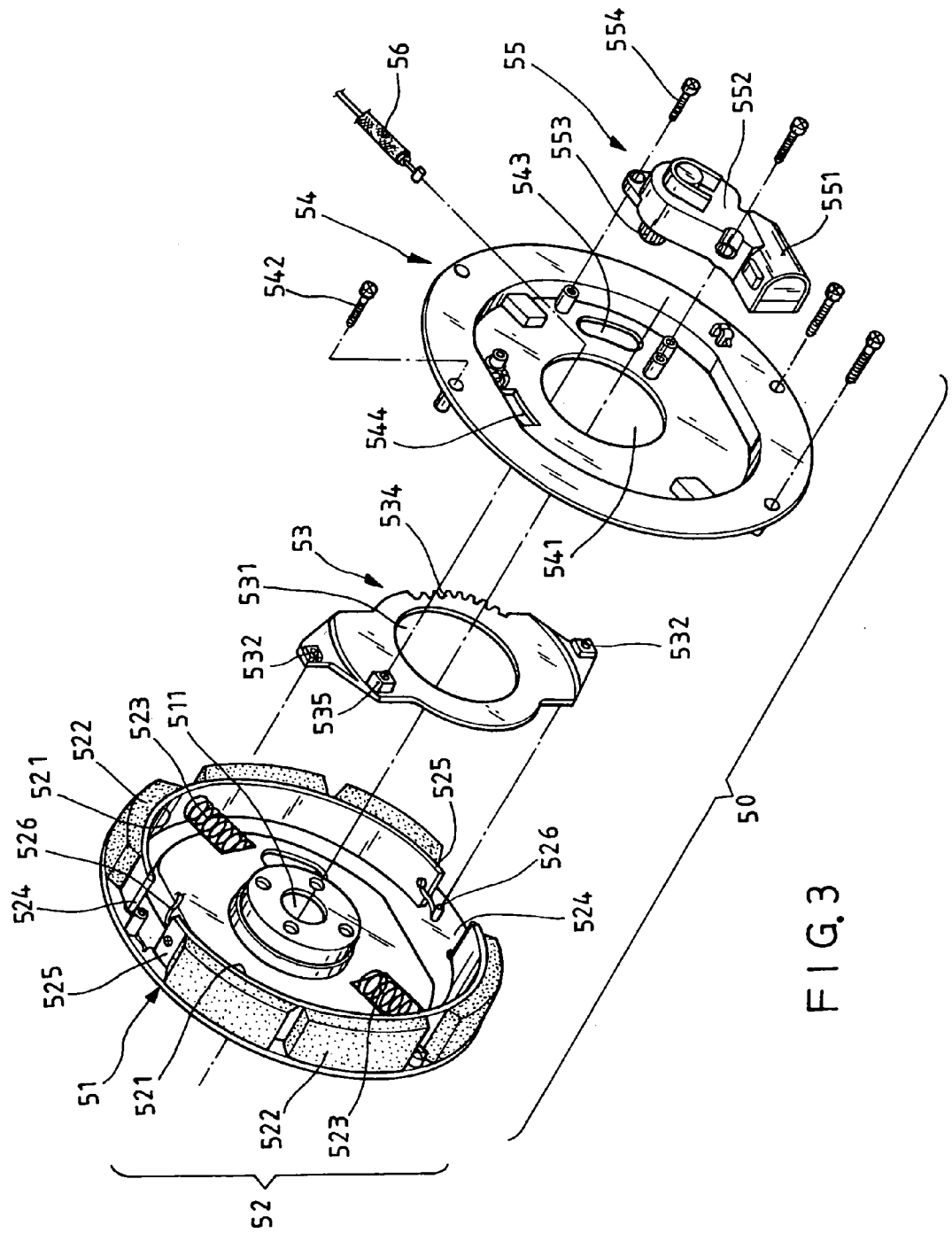
FIG. 3 is an exploded view of a magnetic controlled loading device in accordance with the invention.
Figure 4:
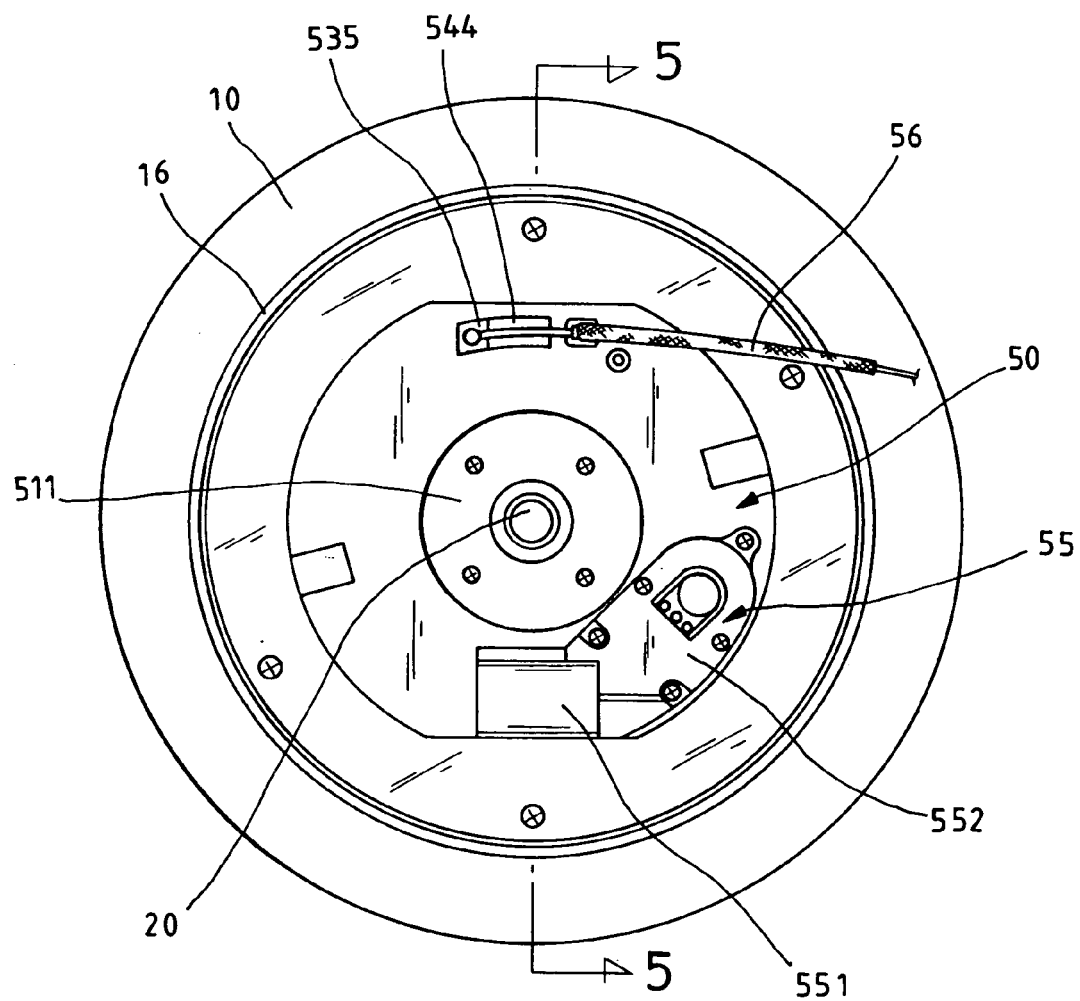
FIG. 4 is an elevational view of the invention.
Figure 5:
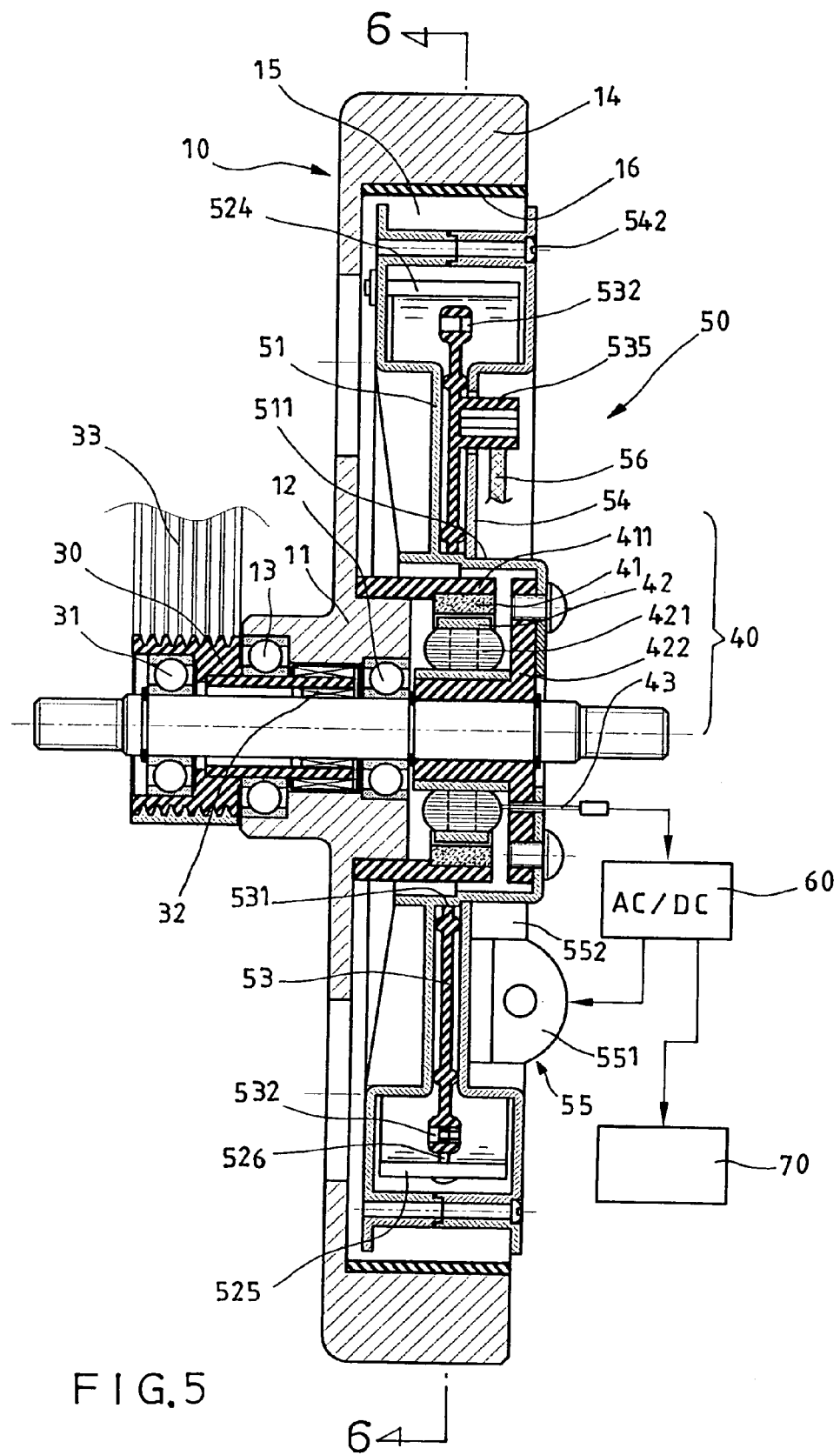
FIG. 5 is a cutaway view taken along the line 5—5 of FIG. 4.

Please refer to the exploded diagram in FIG. 2 along with the cutaway view in FIG. 5. A first and a second bearing 12, 13 is disposed within a hub 11 of the flywheel 10, is (see FIG. 5). The flywheel 10 is recessed under a wheel rim 14, which forms a receptacle 15. A metal conductor 16 is mounted on the inner surface of the wheel rim 14. As shown in FIG. 5, the transmission element 30 is positioned on an outer end of the flywheel 10 and used to turn the flywheel 10. The transmission element 30 can be directly coupled with the flywheel 10. Alternatively, a third bearing 31 is interposed between the transmission element 30 and the shaft 20 while a single direction bearing 32 is installed in the shaft hole to rotate the flywheel 10 in a forward direction. At this point, the transmission element 30 can be constructed as a belt pulley or other types of transmission parts. A belt pulley is shown in the diagram, which is linked to the belt 33. When the belt 33 and the exercise machine (not shown) are linked together, the belt pulley 30 begins to turn on the shaft 20 while the single direction bearing 32 is used to turn the flywheel 10. Since the flywheel 10 has inertia, therefore, when the exercise machines is not turning the belt pulley 30, the flywheel 10 still can turn on the single direction bearing 32 and the first and a second bearing 12. This is used to protect the user from getting hurt on certain types of exercise machines by the reverse rotation of the flywheel's inertia.

Please further refer to FIG. 2 and FIG. 5. The micro power generating set 40 includes a plurality of permanent magnets 41 mounted on the inner surface of the hub 11, and a stator core 42 placed on the shaft 20. In a preferable embodiment, the permanent magnets 41 are fixed on an inner rim of the ring 411 protruding from the hub 11. Meanwhile, the stator core 42 is placed on a base 422 and fitted with a coil 421. The base 422 is positioned within a recess 511 of the magnetic controlled loading device 50. The permanent magnets 41 turn along with the flywheel 10. Relative to the stator core 42, the permanent magnets 41 act as a rotor and forms a magnetic path, which causes the coil 421 to produce power. This is the principle for permanent-magnet alternating current generator. The invention utilizes this principle by making the flywheel 10 as the source for the alternating current power generation, so that the voltage produced will go through a power line 43 and into an AC/DC converter 60. This will provide the power for the magnetic controlled loading device 50 of the invention and achieve electrical loading control. As for the structure of the magnetic controlled loading device 50, please refer to FIG. 3~6, which includes:

an outer cover 51 having a groove 511 opposing to the micro power generating set 40 in the center of the shaft hole;

an adjustable stator 52 having a pair of opposite facing circular magnetic plates 521, the magnetic plates 521 each having a plurality of permanent magnets 522 positioned on the outer side thereof and a plurality of compression springs 523 fitted to the inner side thereof, the magnetic plates 521 each further having a first end swiveled on a pivot 524 and a second movable free end 525, the pivots 524 of the magnetic plates 521 being diagonally positioned on the outer cover 51, a pull rope 526 being joined to the free end 525;

an adjustment disc 53 having a rotation hole 531 for insertion of the outer rim of the groove 511, two positioning grooves 532 facing to the corresponding pull rope 526 at the free ends 525 of the magnetic plates 521 and formed at the top and the bottom end of the adjustment disc 53, and a arched row of teeth 534 positioned at the circumference thereof;

an inner cover 54 adapted to match the outer cover 51, the inner cover 54 having in the middle thereof a positioning hole 541 corresponding to the groove 511, the inner cover 54 being joined to the outer cover 51 with a plurality of screws 542 so that the adjustable stator 52 and the adjustment disc 53 are located between the two covers, the inner cover 54 further having an annular slot 543 corresponding to the arched row of teeth 534; and an electric adjusting driving mechanism 55 including a micro motor 551, a reduction gearbox 552, and a driving pinion 553 protruding from the bottom side of the reduction gearbox 552, the electric adjusting driving mechanism 55 being fastened to the surface of the inner cover 54 by screws 554, the driving pinion 553 further passing through the annular slot 543 of the inner cover 54 to mesh with the arched row of teeth 534.

Moreover, the invention also chose to use a manual adjustment method, i.e. on the adjustment disc 53 of the magnetic controlled loading device 50, there is a protruding member 535 sticking into the circular slot 544 of the inner cover 54. In addition, a control cable 56 for controlling the swiveling action of the adjustment disc 53 is joined to the protruding member 535. This forms a manual adjusting driving mechanism 55.

Therefore, the invention can freely choose to use an electric adjusting driving mechanism 55, or choose to use a manual adjusting driving mechanism 55.

Furthermore, the permanent magnet 41 of the micro power generating device 40 are fixed onto the inner rim of the ring 411 of the hub 11 while the stator core 42 further includes a base 422. The base is locked onto the inside of the groove 511 of the outer cover 51.

Figure 6:
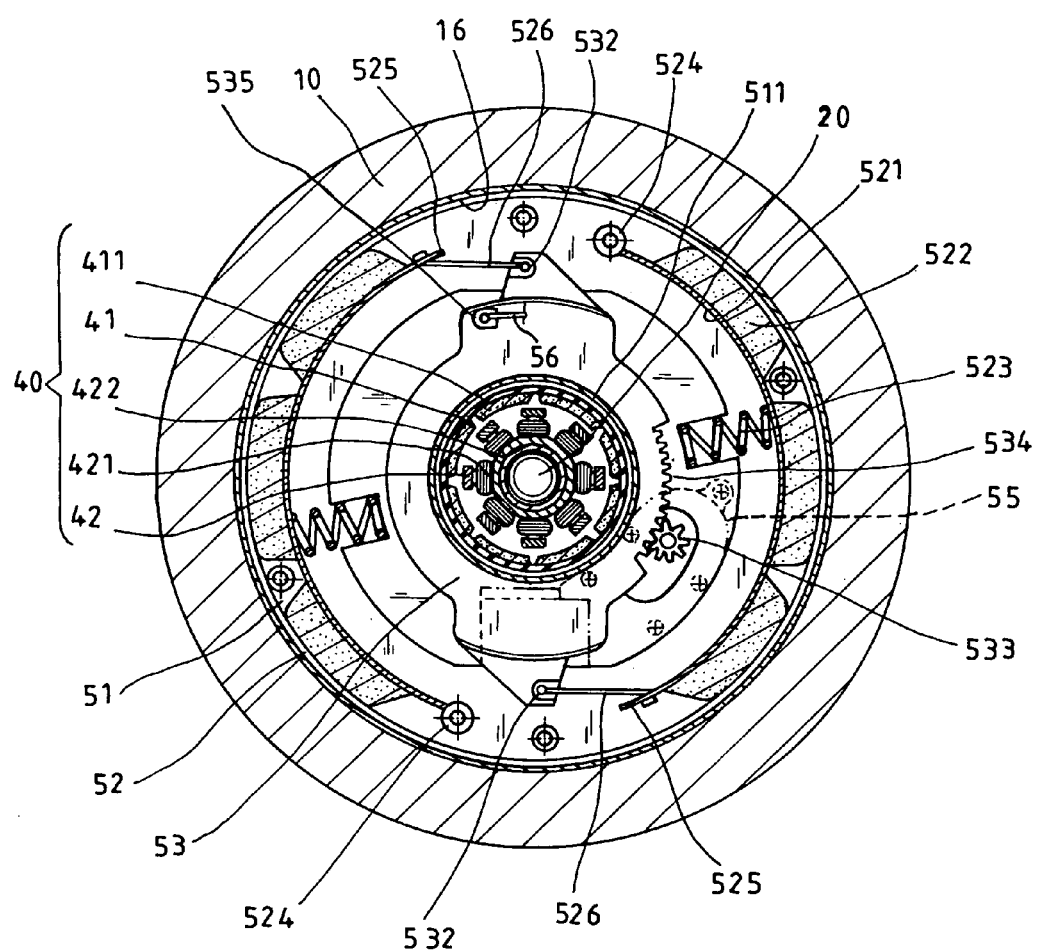
FIG. 6 is a cutaway view taken along the line 6—6 of FIG. 5.
Figure 7:
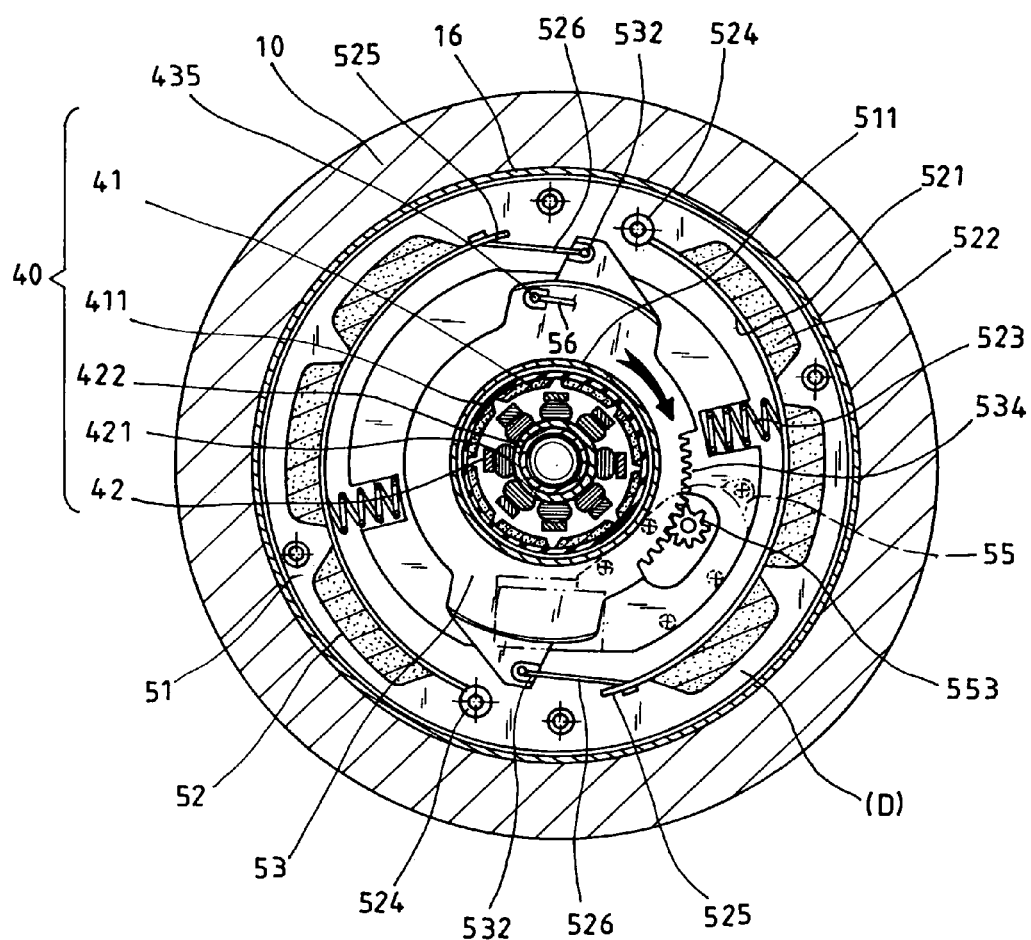
FIG. 7 is a schematic drawing of the invention, showing the action of magnetic control.

Please refer to FIGS. 5 and 6. Through the aforementioned structure, when the flywheel 10 turns, the micro power generating set 40 can supply power to the micro motor 551. The driving pinion 553 then turns the adjustment disc 53. As shown in FIG. 7, when the adjustment disc 53 turns clockwise, the upper and lower pull ropes 526 allows the free end 525 of the magnetic plates 521 to swivel on the pivots 524. As a result, the air gap D between the permanent magnets 522 and the metal conductor 16 on the inner rim of the flywheel 10 is adjustable to permit the change of the magnetic flux density. In this way, the goal of automatic and continuous adjustment of the loading resistance can be achieved.

The main feature of the invention is the utilization of the micro power generating device 40 skillfully designed to fit in the center of the magnetic controlled loading device 50. It does not take up any additional space, and results after testing showed that the power generated by the micro power generating set 40 was sufficient enough to power the micro motor 551. As shown in FIG. 5, there is even enough for the instrument panel or controller 70 to use. Without the need for external power source, it can achieve the goal of self sufficiency.

In addition, another of the invention's features is that its adjustment disc 53 can also link up to a control cable 56. When not using the electric adjusting driving mechanism 55 to control loading, it can be manually controlled using the control cable 56 to change the skewed rotation of the adjustment disc 53, thus achieving dual use on one machine effect.

In conclusion, the invention combines together a magnetic controlled loading device with a micro power generating set and an adjusting driving mechanism. Users can also choose between electrical or manual control of resistance adjustment, which is more practical and advanced.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A magnetic controlled loading device in combination with a power generating set and an adjusting drive mechanism, comprising:
   a) a flywheel having a first and a second bearing disposed within a hub of the flywheel, the flywheel being recessed under a wheel rim, which forms a receptacle, a metal conductor being mounted on the inner surface of the wheel rim;
   b) a shaft passing through the flywheel and having both threaded ends;
   c) a transmission element positioned at the external side of the flywheel and adapted to bring the flywheel in rotation;
   d) a micro power generating set having a plurality of permanent magnets mounted on the inner surface of the hub and a stator core placed on the shaft, the permanent magnets acting relative to the stator core acting as a rotor; and
   e) a magnetic controlled loading device including:
      i) an outer cover having a groove opposing to the micro power generating set in the center of the shaft hole;
      ii) an adjustable stator having a pair of opposite facing circular magnetic plates, the magnetic plates each having a plurality of permanent magnets positioned on the outer side thereof and a plurality of compression springs fitted to the inner side thereof, the magnetic plates each further having a first end swiveled on a pivot and a second movable free end, the pivots of the magnetic plates being diagonally positioned on the outer cover, a pull rope being joined to the free end;
      iii) an adjustment disc having
         1) a rotation hole for insertion of the outer rim of the groove,
         2) two positioning grooves facing to the corresponding pull rope at the free ends of the magnetic plates and formed at the top and the bottom end of the adjustment disc, and
         3) an arched row of teeth positioned at the circumference thereof;
      iv) an inner cover adapted to match the outer cover, the inner cover having in the middle thereof a positioning hole corresponding to the groove, the inner cover being joined to the outer cover with a plurality of screws so that the adjustable stator and the adjustment disc are located between the two covers, the inner cover further having an annular slot corresponding to the arched row of teeth; and
      v) an electric adjusting driving mechanism having an electric and a manual mode for bringing the adjustment disc in rotation.

2. The magnetic controlled loading device as recited in claim 1 wherein the electric adjusting driving mechanism includes a micro motor, a reduction gearbox, and a driving pinion protruding from the bottom side of the reduction gearbox, and wherein the electric adjusting driving mechanism is fastened to the surface of the inner cover by screws, and wherein the driving pinion further passing through the annular slot of the inner cover to mesh with the arched row of teeth.

3. The magnetic controlled loading device as recited in claim 1 wherein the adjusting driving mechanism is constructed in manual mode and includes a protruding member on the surface of the adjustment disc, and wherein the protruding member projects in axial direction into the circular slot of the inner cover, and wherein a control cable for controlling the swiveling action of the adjustment disc is jointed to the protruding member.

4. The magnetic controlled loading device as recited in claim 1 wherein the micro power generating set further comprises a power line through which the voltage produced by the stator core is transmitted to an AC/DC converter and then the direct current is supplied to the micro motor of the electric adjusting driving mechanism.

5. The magnetic controlled loading device as recited in claim 1 wherein the permanent magnets are fixed on an inner rim of the ring protruding from the hub, and wherein the stator core further includes a base that is positioned within a recess of the outer cover.

6. The magnetic controlled loading device as recited in claim 1 wherein a third bearing is interposed between the transmission element and the shaft while a single direction bearing is installed in the shaft hole to rotate the flywheel in a forward direction.

* * * * *